United States Patent [19]

Tanimoto et al.

[11] Patent Number: 4,866,767
[45] Date of Patent: Sep. 12, 1989

[54] SUBSCRIBER LINE INTERFACE CIRCUIT

[75] Inventors: Hiroshi Tanimoto; Minoru Tanaka, both of Kawasaki; Satoru Yoshida, Tokyo, all of Japan

[73] Assignee: Kabushiki Kaisha Toshiba, Kawasaki, Japan

[21] Appl. No.: 232,844

[22] Filed: Aug. 16, 1988

[30] Foreign Application Priority Data

Aug. 21, 1987 [JP] Japan ................................ 62-206421

[51] Int. Cl.$^4$ ...................... H04M 1/76; H04M 19/00
[52] U.S. Cl. .................................. 379/398; 379/405; 379/413
[58] Field of Search ............... 379/399, 413, 402, 403, 379/404, 405, 345, 324, 398

[56] References Cited

U.S. PATENT DOCUMENTS

| 4,484,032 | 11/1984 | Rosenbaum ..................... 379/405 X |
| 4,514,595 | 4/1985 | Rosenbaum et al. ................ 379/385 |
| 4,600,811 | 7/1986 | Hayashi et al. .................. 379/405 X |

FOREIGN PATENT DOCUMENTS

| 0147230 | 7/1985 | European Pat. Off. ............ 379/398 |
| 3108647 | 2/1982 | Fed. Rep. of Germany . |
| 3115892 | 2/1982 | Fed. Rep. of Germany . |
| 3142201 | 9/1982 | Fed. Rep. of Germany ...... 379/398 |
| 3517878 | 11/1985 | Fed. Rep. of Germany ...... 379/398 |
| 3428106 | 2/1986 | Fed. Rep. of Germany ...... 379/398 |

OTHER PUBLICATIONS

Am 7950 Subscriber Line Interface Circuit, Advanced Information; Advanced Micro Devices, Inc., Jun. 1984.
Ericson Review, No. 4, pp. 192-200, 1983, "Line Circuit Component SLIC for AXE 10"; Arne Rydin and Jackie Sundvall.

Primary Examiner—James L. Dwyer
Attorney, Agent, or Firm—Oblon, Spivak, McClelland, Maier & Neustadt

[57] ABSTRACT

The subscriber line interface circuit comprises subscriber nodes, reception nodes and transmission nodes, a power feeding unit, adders, impedance elements, an inverting amplifier, and a feedback element. The subscriber nodes are coupled to a subscriber terminal via a subscriber line, and the reception and transmission nodes are coupled to an exchange via a reception line and a transmission line, respectively. The feeding unit supplied a DC current to the terminal and controls the current. The first adder adds the voltage between the subscriber nodes and the voltage from the reception node. The first impedance element has an impedance corresponding to a real-number multiplication of the impedance between the subscriber nodes, and is applied with the output voltage of the first adder. The amplifier is given with the output of the first impedance element. The second impedance element, inserted in the feedback path of the amplifier, has an impedance corresponding to a real-number multiplication of the impedances of the subscriber line and the terminal. The feedback element supplies, to the feeding unit, a signal corresponding to the current flowing through the first impedance element as a control signal. The second adder adds the output voltage of the amplifier, the output voltage of the first adder and the voltage of the reception nodes, and supplies the resultant signal to the transmission nodes.

8 Claims, 7 Drawing Sheets

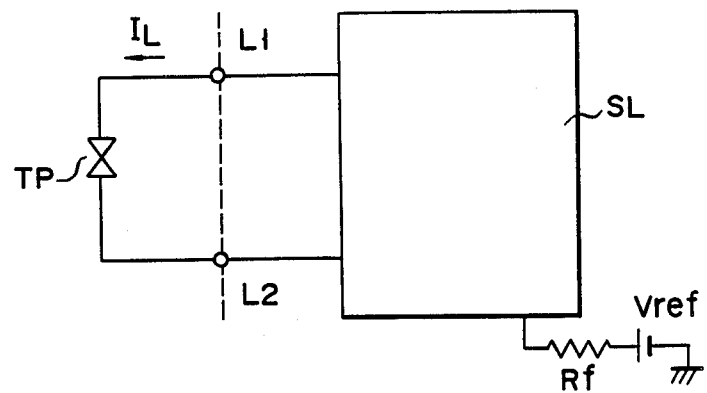
F I G. 5
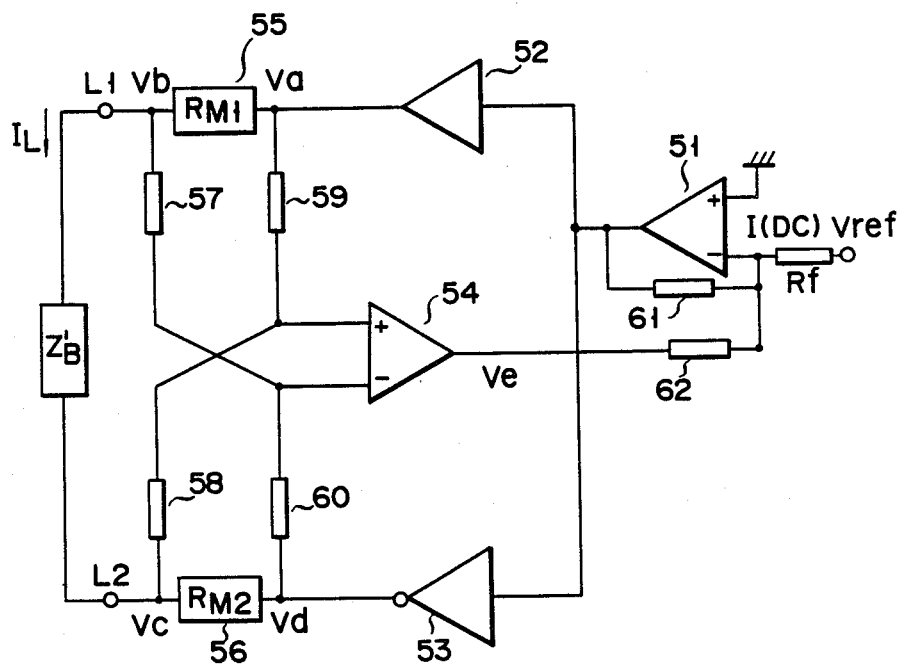
F I G. 6

SUBSCRIBER LINE INTERFACE CIRCUIT

BACKGROUND OF THE INVENTION

1. Field of the Invention

This invention relates to a subscriber line interface circuit (SLIC) adapted for use in an electronic switching system.

2. Description of the Related Art

A subscriber line interface circuit is used to couple a subscriber terminal, typically a telephone set, with an exchange (an electronic exchange, particularly a digital exchange).

The subscriber line interface circuit is s coupled to a telephone set (subscriber terminal) and an exchange, and handles battery feed or current feed (B), supervisory (S) and hybrid functions (H). The supervisory function supplies a DC current to the telephone set coupled to a telephone line (or a subscriber line) and monitors the status of the handset of the telephone set. That is, the supervisory function monitors whether the handset is in the on-hook state or off-hook state. The battery feed function supplies a DC current to the telephone set to drive an audio exchange for the purpose of telephone communications. The hybrid function is a so-called a 2-to-4/4-to-2 wire conversion function, which terminates the telephone line with a complex impedance that matches with the telephone line set into impedance, extracts a communication signal from the telephone set into the exchange, and transfers a communication signal from the switching device of the exchange to the telephone set via a communications line. The subscriber line interface circuit having these functions may sometimes be called "BSH circuit."

As mentioned above, it is necessary to supply a constant DC current to a telephone set via a telephone line, and at the same time, a voice signal flows through this same telephone line. In order to separate the voice signal, which includes an AC component, from the constant DC current and prevent the AC component from subscriber line interface circuit that comprises a hybrid coil and a switching current is provided with a large inductance coupled in series to a DC power source. With this design, the DC current is supplied to the telephone set via the inductance element. In order to prevent the DC current from leaking onto the telephone line, thus preventing the DC component from being superimposed onto the voice signal, a capacitor of as large as 2 μF is coupled in series to each of a pair of telephone lines so that the voice signal is transferred via this capacitor to the hybrid circuit for 2-to-4/4-to-2 wire conversion.

However, the subscriber line interface circuit of this type needs relatively large inductance element and capacitor. In this respect, this subscriber line interface circuit is not suitable to make the electronic exchange compact, reduce the manufacturing cost of the subscriber line interface circuit or realize its large integration.

In circuit calculation or design, the line impedance of a telephone line is typically treated to be 600Ω. A standard telephone set is designed such that it would have the best side tone characteristic when coupled to a subscriber line interface circuit through a telephone line whose length is set to provide a line loss of 5 dB. However, in the case of a private branch (PBX), the telephone line has a relatively short length and its allowed line loss is reduced to 2 dB or below.

Since a subscriber line interface circuit is used in such a private branch exchange, its terminal impedance and/or balance network impedance is demanded to have a complicated characteristic that should also include the cable characteristic of the telephone line.

As already mentioned, the conventional subscriber line interface circuit needs a large inductance and/or capacitor to attain a predetermined impedance, so that this restriction significantly hinders the realization of a compact exchange. To overcome this problem, it has been proposed to realize the functions of the traditional subscriber line interface circuit using an electronic circuit. However, this electronic circuit needs a number of circuit elements and is not therefore effective in reducing the size and the manufacturing cost of the subscriber line interface circuit.

An example of such an electronic subscriber line interface circuit is disclosed in Japanese Patent Disclosure (Kokai) No. 58-104558. For example, FIG. 3 of this publication shows a series circuit of a terminal resistor (31) and a capacitor (32) of a subscriber line, which gives a predetermined value to the impedance of the subscriber line interface circuit as measured from the side of the subscriber terminal. The system with such a series circuit requires that the capacitor should have a large volume or a large size. This stands in the way to reduce the size of the system (the subscriber line interface circuit). In addition, the conventional circuit necessitates that a resistor denoted by 52 in FIG. 3 or 68 in FIG. 4 of the aforementioned Japanese publication should have a highly accurate absolute value and should be constituted by a discrete element for securing the necessary accuracy. Since the above capacitor and resistors are constituted by discrete elements, not all the constituent elements of the conventional subscriber line interface circuit can be integrated in a circuit if tried. Therefore, enlarging the overall exchange system cannot be avoided.

The number of subscriber line interface circuits in use increases as the number of lines that the exchange handles increases. This means that reduction in size and manufacturing cost of the overall exchanger system cannot be realized without reducing the size and the manufacturing cost of the subscriber line interface circuit itself.

As mentioned above, a conventional electronic circuit requires elements large in size and number and also a complex control in order for the circuit to provide the terminal impedance and/or various functions, such as the current feed, supervisory and hybrid functions, necessary for a subscriber line interface circuit.

SUMMARY OF THE INVENTION

With the above situation in mind, it is an object of this invention to provide a subscriber line interface circuit, which eliminates the need to use large elements and ensures large scale integration (LSI) and reduction in size and manufacturing cost, thus contributing to reducing the size and manufacturing of the overall exchange system.

The subscriber line interface circuit according to this invention comprises a pair of subscriber nodes, a pair of reception nodes and a pair of transmission nodes, a power feeding unit, first and second adder units, first and second impedance elements, an inverting amplifier, and a feedback element. The subscriber nodes are coupled to a subscriber terminal via a subscriber line, and the reception and transmission nodes are coupled to an exchange via a unilateral reception line and a unilateral transmission line, respectively. The power feeding unit supplies a DC current to the subscriber terminal and controls the current. The first adder unit adds the voltage between the subscriber nodes and the voltage supplied from the reception node. The first impedance element has an impedance corresponding to a real-number multiplication of the impedance between the subscriber nodes, as observed from the side of the subscriber line, and is applied with the output voltage of the first adder unit. The inverting amplifier is given with the output of the first impedance element. The second impedance element, which is inserted in the feedback path of the inverting amplifier, has an impedance corresponding to a real-number multiplication of the impedances of the subscriber line and the subscriber terminal, as observed from the side of the subscriber nodes. The feedback element supplies, to the power feeding unit, a signal corresponding to the current flowing through the first impedance element as a control signal. The second adder unit adds the output voltage of the inverting amplifier, the output voltage of the first adder unit and the voltage supplied to the reception node, and supplies the resultant signal to the transmission node.

A practical example of the subscriber line interface circuit according to this invention has a power feeding unit, which feeds a DC current to the subscriber terminal from a pair of subscriber nodes $L_1$ and $L_2$ via the subscriber line. This power feeding unit is capable of controlling the output current in response to a control signal. The voltage between subscriber nodes $L_1$ and $L_2$ and the received voltage $V_{RX}$ supplied to the reception node from the exchange via the reception line are each subjected to weighting and are then added together. The resultant voltage $V_P$ is supplied to the first impedance element having a complex impedance $NZ_T$. the impedance $Z_T$ of the subscriber line interface circuit, which is measured from the side of the subscriber nodes. The first impedance element is coupled to the inverting input node of a buffer amplifier, which is provided with a negative-feedback by the second impedance element having an impedance $MZ_B$. This impedance $MZ_B$ equals M (real number) times the impedance $Z_B$ of the subscriber terminal as measured from the side of the subscriber line interface circuit. The current flowing through the first and second impedance elements is fed back to the power feeding unit as a control signal. (Since the input impedance of the buffer amplifier is sufficiently large, the current flowing through the second impedance element accords with the current flowing through the first impedance element.)

According to the subscriber line interface circuit of this invention, the size or the number of the circuit elements can be significantly reduced by detecting a load current from the impedance element provided on the input side of the buffer amplifier or from the impedance element that forms the feedback path of the buffer amplifier. Moreover, since the values of these impedance elements are each a real-number multiplication of the terminal impedance, the value of a capacitor included in each impedance element is a real-number fraction of the terminal impedance. This means that a small capacitor suffices for each impedance element. What is more, according to this subscriber line interface circuit, the detected DC current can be fed back to the power feeding unit without converting it to a voltage.

As should be understood from the above description, when the detected DC current is fed back without any conversion to the power feeding unit, it is not necessary to use a resistor with an accurate absolute value, which should be constituted by a discrete element when integrating the subscriber line interface circuit into a circuit.

BRIEF DESCRIPTION OF THE DRAWINGS

FIG. 5 is a diagram for explaining a current feed function of a subscriber line interface circuit;

FIG. 6 is a block diagram exemplifying the configuration of a power feeding circuit used in the subscriber line interface circuit of this invention;

DETAILED DESCRIPTION OF THE PREFERRED EMBODIMENTS

A subscriber line interface circuit according to the first embodiment of this invention will now be explained.

To begin with, the hybrid function and the impedance balancing in a subscriber line interface circuit will be summarized.

Figure 1A:
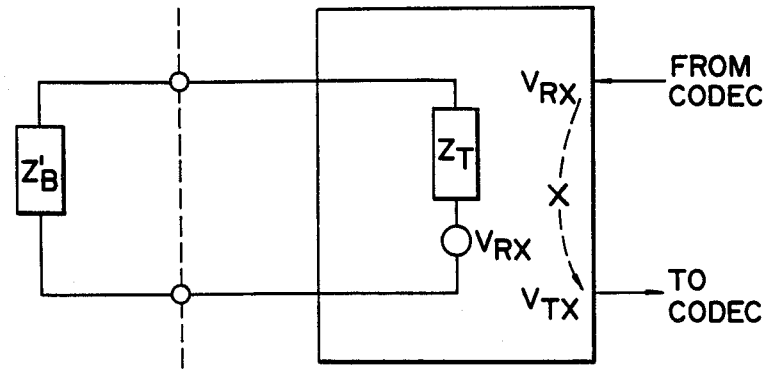
FIGS. 1A and 1B are diagrams for explaining the hybrid function of a subscriber line interface circuit.
Figure 4:
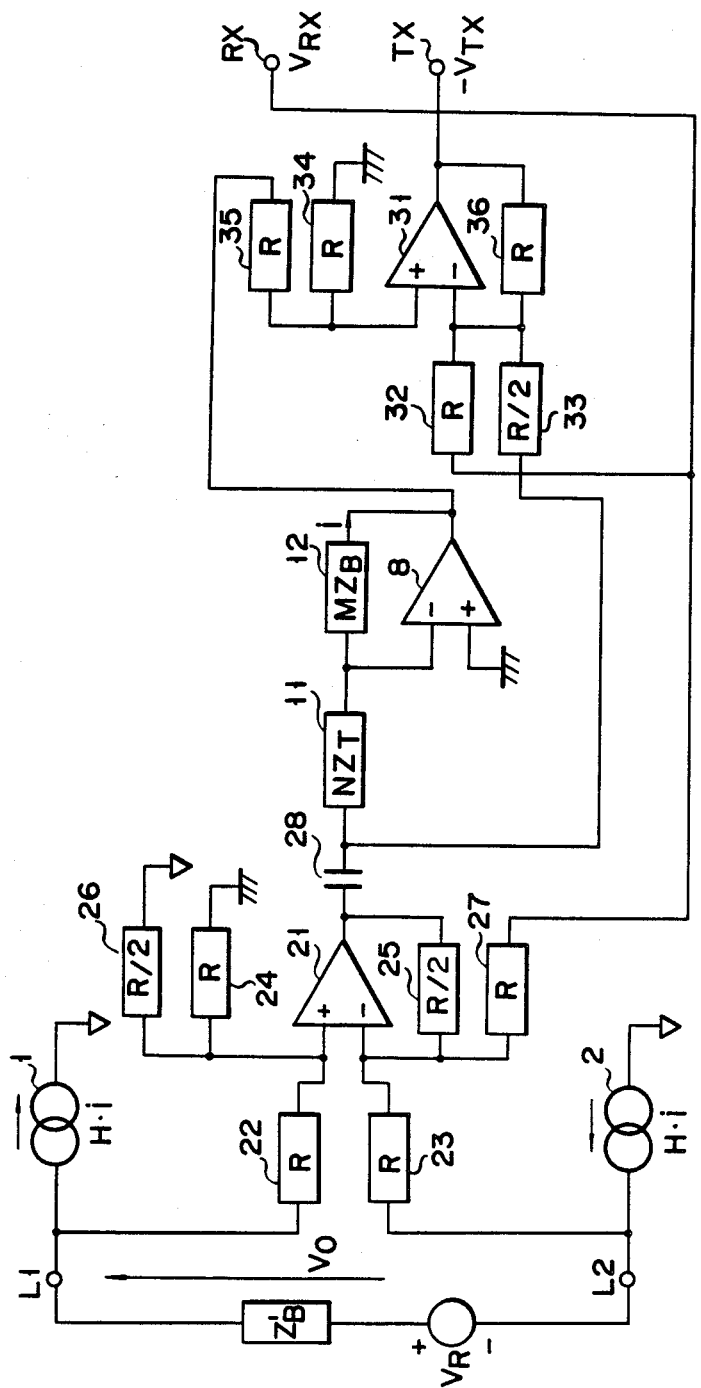
FIG. 4 is a block diagram showing the configuration of a subscriber line interface circuit according to the second embodiment of this invention.

Referring to FIG. 1A, 4-to-2 wire conversion is explained below.

The 4-to-2 wire conversion is a function, which, in an audio band (0.3 kHz–3.4 kHz), (a) makes the appeared impedance of the subscriber line interface circuit (the right-hand side of the broken line in FIG. 1A), as measured from the side of a subscriber (the left-hand side of the broken line in the diagram), as $Z_T$, and (b) causes a reception signal $V_{RX}$ from a codec of an exchanger to have a level of $\{Z_B'/(Z_T+Z_B')\}V_{RX}$ and be transmitted to the subscriber's side, and (c) prevents the received signal $V_{RX}$ from being mixed into a transmission signal $V_{TX}$ (i.e., making VRX=0 at the transmission node).

Figure 1B:
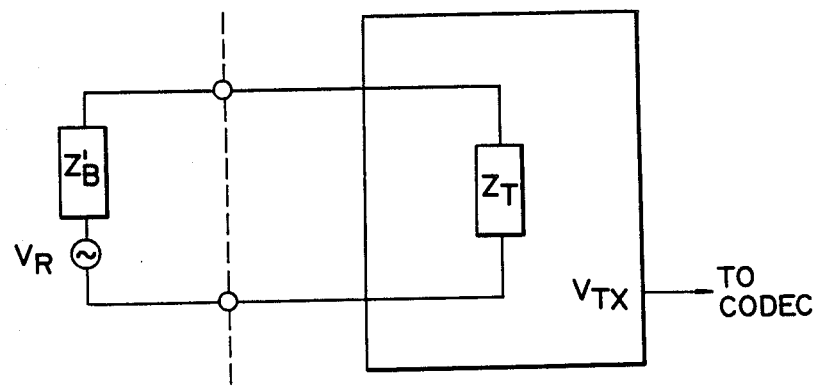
Figure 2:
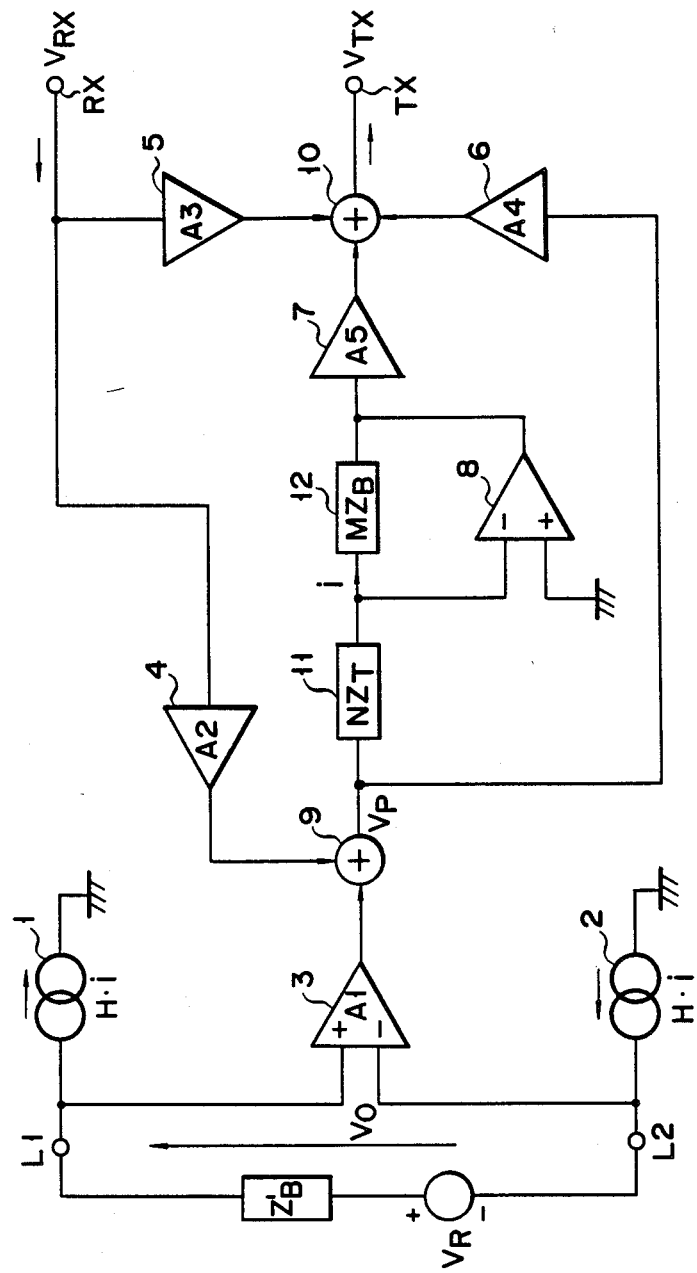
FIG. 2 is a block diagram for explaining the principle of a subscriber line interface circuit according to the first embodiment of this invention.

Referring now to FIG. 1B, 2-to-4wire conversion is explained below.

The 2-to-4 wire conversion is a function, which, in the above audio band, (d) makes the appeared impedance of the subscriber line interface circuit, as measured from the subscriber's side, as a predetermined value $Z_T$, which can externally be set, and (e) prevents a signal voltage $V_R$ from the subscriber terminal (which may be generated by a speech made by a subscriber) from being transmitted, as a transmission signal $V_{TX}$, to the codec of the exchange.

The following explains the principle of the subscriber line interface circuit according to the first embodiment of this invention, which satisfies these conditions (a) to (e), with reference to FIG. 2.

The subscriber line interface circuit shown in FIG. 2 comprises current sources 1 and 2, buffer amplifiers 3 to 8, adders 9 and 10 and impedance elements 11 and 12.

A subscriber terminal, such as a subscriber telephone set, is coupled to subscriber nodes $L_1$ and $L_2$ via a subscriber line. In FIG. 2, the left-hand side of subscriber node $L_1$ and $L_2$ is the subscriber's side (the subscriber line and subscriber terminal), while the right-hand side is the subscriber line interface circuit. The AC voltage between subscriber nodes $L_1$ and $L_2$ is $V_0$, the equivalent impedance (load) of the subscriber's side as measured from subscriber nodes $L_1$ and $L_2$ is $Z_B'$ and the AC voltage, such as a speech signal, that is generated by the subscriber terminal (or by the subscriber's speech), is $V_R$. AC components H·i of the currents, which are generated from current sources 1 and 2 in the arrow directions in FIG. 2, flow through the subscriber line. (The output currents of these current sources can be controlled.) The current H·i is set to be H times the AC current i that flows through an impedance element 12 (to be described later) with a value $MZ_B$, i.e., M times the balancing impedance, where M is a real number. The amplification factors (weighting coefficients) of buffer amplifiers 3–8, which are weighting circuits, are $A_1$ to $A_5$, respectively. Although not illustrated, reception node RX and transmission node TX are coupled to the exchange via a unilateral reception line and a unilateral transmission line, respectively. Reception voltage $V_{RX}$ is input to reception node RX from the exchange, while transmission voltage $V_{TX}$ is output to the exchange from transmission node TX.

The voltage $V_0$ between subscriber nodes $L_1$ and $L_2$ is supplied via buffer amplifier 3 to adder circuit 9, which is supplied with voltage $V_{RX}$ from reception node RX via buffer amplifier 4 having an amplification factor of $A_2$. Consequently, adder circuit 9 performs an addition (or a subtraction) on voltages $V_0$ and $V_{RX}$ that have been subjected to a weighting operation. That is, voltages $V_0$ and $V_{RX}$, which have been weighted respectively by the amplification factors of buffer amplifiers 3 and 4, are added (or subtracted from each other), thus providing voltage $V_P$. This voltage $V_P$ is applied to the inverting input node of buffer amplifier 8 via impedance element 11, which has a complex impedance $NZ_T$ that equals N (real number) times the impedance ZT of the subscriber line interface circuit as measured from the side of the subscriber terminal. Impedance element 12, which has a complex impedance $MZ_B$ equal to M times the nominal impedance $Z_B$ of the subscriber terminal's side, is provided between the inverting input node and the output node of buffer amplifier 8, thus forming a feedback path. The current i flowing through impedance element 12 is fed back to current sources 1 and 2 to control them so that a current, which is H times current i, is supplied to the subscriber terminal. The output of buffer amplifier 8 is supplied to adder circuit 10 via buffer amplifier 7 with amplification factor $A_5$. Adder circuit 10 is also supplied with voltage $V_{RX}$ via buffer amplifier 5 with amplification factor $A_3$ and voltage $V_P$ via buffer amplifier 6 with amplification factor $A_4$. As a result, adder circuit 10 performs an addition (or a subtraction) of the output voltage of buffer amplifier 8, voltage $V_{RX}$ and voltage $V_P$, which have been weighted by amplifiers 7, 5 and 6, respectively. The resultant voltage is supplied to transmission node TX as transmission voltage $V_{TX}$.

The subscriber line interface circuit with the aforementioned configuration is characterized in detecting load current i by the feedback path of buffer amplifier 8. This feature is further explained below.

(I) [4-to-2 Wire Conversion/Transmission]

First, let us consider the transmission of the unilateral reception voltage $V_{RX}$ received at reception node RX to subscriber nodes $L_1$ and $L_2$ (voltage $V_0$). Here, the subscriber-originated signal voltage $V_R=0$.

Paying attention to voltage $V_0$ and current i, the following equation is yielded using the actual AC impedance $Z_B'$ on the subscriber's side.

$$V_0 = -H \cdot i \cdot Z_B' \tag{1}$$

Rearranging equation (91) yields $$i = -V_0/H \cdot Z_B' \tag{2}$$

Using the terminal complex impedance ZT yields $$A_1 V_0 + A_2 V_{RX} = NZ_T \tag{3}$$

Substituting equation (2) into equation (3) yields $$A_1 V_0 30 \, A_2 V_{RX} = \cdot -(V_0/H \cdot Z_B') \cdot NZ_T$$

$$V_0 = -\frac{Z_B'}{(A_1/A_2)Z_B' + (N/A_2H)Z_T} V_{RT} \tag{4}$$

Setting $A_1 = -A_2$ and $A_2H = -N$ yields $$V_0 = \frac{Z_B'}{Z_B' + Z_T} V_{RT} \tag{5}$$

Thus the impedance of the subscriber's side as measured from subscriber nodes $L_1$ and $L_2$ is $Z_T$. (That is, the aforementioned conditions (a) and (b) are satisfied.)

Next, let us consider the transmission of the unilateral reception voltage $V_{RX}$ received at reception node RX to the unilateral transmission voltage $V_{TX}$ at transmission node TX.

Transmission voltage $V_{RX}$ is expressed by the following equation:

$$V_{TX} = (A_1 V_0 + A_2 V_{RX})\left(\frac{-MZ_B}{NZ_T} A_5 + A_4\right) + A_3 V_{RT} \tag{6}$$

Substituting equation (5) into equation (6) yields

-continued
$$V_{TX} = \left(A_1 \frac{Z_B'}{Z_B' + Z_T} V_{RT} + A_2 V_{RT}\right)\left(\frac{-MZ_B}{NZ_T} A_5 + A_4\right) + A_3 V_{RT}$$

$$= V_{RT}\left\{\frac{Z_B'}{Z_B' + Z_T} A_1 \left(-\frac{MZ_B}{NZ_T} A_5 + A_4\right) - A_2 A_5 \frac{MZ_B}{NZ_T} + A_2 A_4 + A_3\right\}$$

$$= V_{RX}\left\{\frac{Z_B'}{Z_B' + Z_T} A_1 \left(\frac{A_4 Z_T - A_5 \frac{M}{N} Z_B}{Z_T}\right) + A_2\left(A_4 - A_5 \frac{M}{N} \frac{Z_B}{Z_T} + A_3\right)\right\}$$

$$= V_{RX}\left\{\frac{Z_B'}{Z_B' + Z_T} A_1 \left(\frac{A_4 Z_T - A_5 \frac{M}{N} Z_B}{Z_T}\right) + A_2\left(\frac{A_4 Z_T - A_5 \frac{M}{N} Z_B}{Z_T}\right)\right\} + A_3$$

$$= V_{RX}\left\{\left(\frac{A_4 Z_T - A_5 \frac{M}{N} Z_B}{Z_T}\right)\left(\frac{Z_B'}{Z_B' + Z_T} A_1 + A_2\right) + A_3\right\}$$

Setting $A_2 = -A_1$ from the condition to attain equation (5), we obtain the following equation:

$$V_{TX} = V_{RX}\left\{\left(\frac{A_4 Z_T - A_5 \frac{M}{N} Z_B'}{Z_T}\right)\left(\frac{Z_B}{Z_B' + Z_T} A_1 + A_1\right) + A_3\right\} \quad (7)$$

$$= V_{RX}\left\{A_1\left(\frac{A_4 Z_T - A_5 \frac{M}{N} Z_B}{Z_T}\right)\left(\frac{-Z_T}{Z_B' + Z_T}\right) A_3\right\}$$

Now, let $$A_4 = -A_5$$

$$A_1 \cdot A_4 = A_3 \quad (14)$$

and substituting the above conditions to equation (7), we obtain $$V_{TX} = V_{RX}\left\{A_1 A_4\left(\frac{Z_T + A_5 \frac{M}{N} Z_B}{Z_T}\right)\left(\frac{-Z_T}{Z_B' + Z_T}\right) + A_3\right\} \quad (8)$$

$$= V_{RX}\left\{A_3\left(\frac{Z_T + \frac{M}{N} Z_B}{Z_T}\right)\left(\frac{-Z_T}{Z_B' + Z_T}\right) + A_3\right\}$$

Let $M = N$ and that the impedance balancing is given, i.e., $Z_B = Z_B'$. (The nominal impedance $Z_B$ of the subscriber terminals side is equal to the actual impedance $Z_B'$.) Then, $$V_{TX} = 0$$

which means that the mixing of reception voltage $V_{RX}$ into transmission voltage $V_{TX}$ can be suppressed. (The aforementioned condition (c) is therefore satisfied.)

(II) [2-to-4 Wire Conversion/Blancing]

First, let us consider the transmission of signal voltage $V_R$ (the output of the subscriber terminal) to transmission voltage $V_{TX}$ at transmission node TX. letting $V_{RX} = 0$ in equation (6) yields $$V_{TX} = A_1 V_0 \left(-\frac{Z_B}{Z_T} A_5 + A_4\right) \quad (9)$$

Also, the following is satisfied:

$$V_0 = V_R - Z_B' \cdot Hi \quad (10)$$

$$A_1 V_0 = N Z_T \cdot i$$

Eliminating the term i from equation (10) and solving the equation for $V_0$, we obtain $$V_0 = \frac{Z_T}{Z_T + \frac{A_1 H}{N} Z_{B'}} V_R \quad (11)$$

From equations (11) and (4), we obtain $$V_0 = \frac{Z_T}{Z_T + Z_{B'}} V_R \quad (12)$$

Therefore, the input impedance of the subscriber line interface circuit as measured from the subscriber's side at the time of signal transmission can also be set to $Z_T$. (That is, the aforementioned condition (d) is satisfied.) Substituting equation (11) into equation (9) yields $$V_{TX} = \left( \frac{A_1 Z_T}{Z_T + \frac{A_1 \cdot H}{N} Z_{B'}} \right) \left( -\frac{Z_B}{Z_T} A_5 + A_4 \right) V_R \quad (13)$$

Now, substituting equations (4), (14) and (15) given below into equation (13) to set $V_{TX} = V_R$, $$A_1 \cdot A_4 = A_3 = 1 \quad (15)$$

then $$V_{TX} = \frac{Z_T + Z_B}{Z_T + Z_{B'}} V_R \quad (16)$$

even if $Z_0 \neq Z_T$.

Therefore, when the impedance balancing is attained, i.e., when $Z_B = Z_{B'}$, $V_{TX} = V_R$ so that, for example, a speech signal from the subscriber is transmitted onto the unilateral transmission line from transmission node TX without linear distortion. (This satisfies the condition (e).) It is intended that nominal impedance $Z_B$ be equal to actual impedance $Z_{B'}$, but, in practice, it is not always possible to establish the relation $Z_B = Z_{B'}$ in the audio band. This is why the nominal and actual impedances are distinguished from each other by using $Z_B$ and $Z_{B'}$, respectively. If no distortion compensation is made by the impedance balancing, which means to assuming that $Z_B = 0$ ($Z_B$ cannot be set to 0 in an actual circuit), then $$V_{TX} = \frac{Z_T}{Z_T + Z_{B'}} V_R$$

Consequently, as is the case for an ordinary balancing circuit, no linear distortion occurs when $Z_T = Z_{B'}$; however, a signal transmission loss occurs. If $Z_T \neq Z_{B'}$, then the linear distortion occurs.

As explained above, according to the circuit shown in FIG. 2, by using an impedance that is N times the supposedly necessary terminal impedance and balancing impedance to set the amplification factors (weighting coefficients $A_1$-$A_5$) as described above, the capacitances included in these impedances can have 1/N of the otherwise necessary values, and the complex terminal impedance and hybrid function that are necessary for the subscriber line interface circuit can also be attained. In addition, since current i flowing through impedance element 12 having impedance $MZ_B$ is fed back to current sources 1 and 2, the complex terminal impedance and the hybrid function can be realized at the same time.

Figure 3:
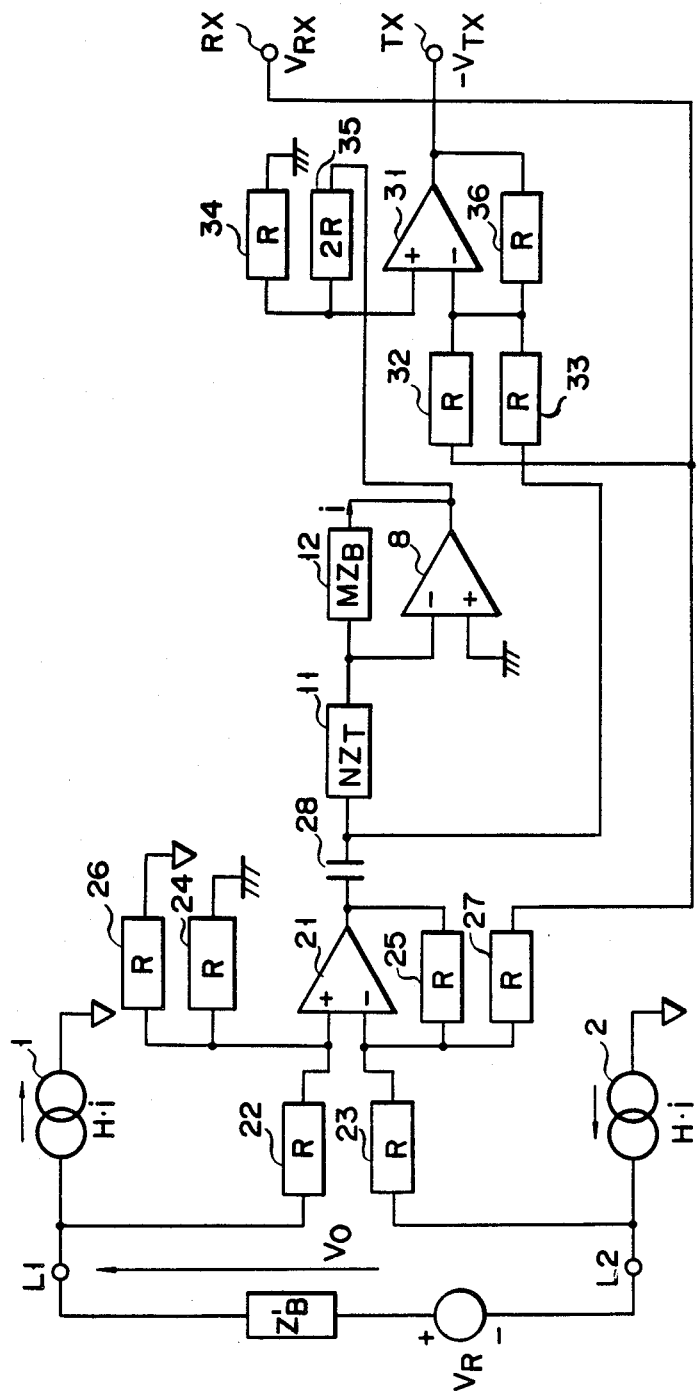
FIG. 3 is a block diagram showing the configuration of the subscriber line interface circuit according to the first embodiment of this invention, which is operated under the principle illustrated in FIG. 2.

Referring now to FIG. 3, the following explains a subscriber line interface circuit according to the first embodiment of this invention which is designed on the basis of the above-explained principle.

For easier understanding and also simplicity, reference numerals used in FIG. 2 are also used in FIG. 3 to denote the corresponding or substantially identical elements. The circuit section constituted by buffer amplifiers 3 and 4 and adder circuit 9 in FIG. 2 is constituted by a buffer amplifier 21, resistors 22-27 and a capacitor 28 in FIG. 3. The circuit section constituted by buffer amplifiers 5-7 and adder circuit 10 in FIG. 2 is constituted by a buffer amplifier 31 and resistors 32-36 in FIG. 3.

To set amplification factors $A_{1-A5}$ of buffer amplifiers 3-7 to satisfy the conditions expressed by equations (4), (14) and (15) while reducing the number of the actually necessary buffer amplifiers as fewer as possible, these amplification factors need to be set, for example, as follows:

$A_1 = A_3 = A_4 = 1$, and $A_2 = A_5 = -1$

Since the phase of transmission voltage $V_{TX}$ is not so important from the functional view point, the number of the buffer amplifiers can be further reduced by outputting putting voltage $-V_{TX}$ instead of $V_{TX}$, thus setting $A_3 = A_4 = -1$ and $A_5 = 1$. The subscriber line interface circuit shown in FIG. 3 is designed in this manner. The resistances of resistors 22-27, 32-34 and 36 are R and the resistance of resistor 35 is 2R. The elements of this subscriber line interface circuit are arranged in FIG. 3 to show easier correspondences with amplification factors (weighting coefficients) shown in FIG. 2. Further, $H = M = N = 100$ and $Z_B = Z_{B'}$. Since a DC current flows in an actual subscriber line, capacitor 28 is provided on the output side of buffer amplifier 21 to remove the DC component. For this purpose, instead of capacitor 28, capacitors may be inserted respectively between resistor 22 and subscriber node $L_1$ and between resistor 23 and subscriber node $L_2$. However, this type of capacitor with a high withstand voltage needs to be large, so that the fewer such capacitors, the better. The circuit of FIG. 3 is designed to fulfill this condition, and therefore requires such a capacitor (28) only in the illustrated location. Subscriber nodes L1 and L2 are coupled to current-controlled current sources 1 and 2, respectively. Subscriber node $L_1$ is coupled to the non-inverting node of buffer amplifier 21 through resistor 22. One end of each of resistors 24 and 26 is coupled in common to the non-inverting node of buffer amplifier 21, while the other end of resistor 24 is coupled to a common potential (ground) and the other end of resistor 26 is coupled to a given, fixed potential. Subscriber node $L_2$ is coupled the inverting input node of buffer amplifier 21 through resistor 23. Resistor 25 is coupled between the output node and the inverting input node of buffer amplifier 21, and resistor 27 is coupled between the inverting input node of buffer amplifier 21 and reception node RX. The output node of buffer amplifier 21 is coupled through capacitor 28 to one end of first impedance element 11 having an N-fold terminal impedance ($NZ_T$). The other end of impedance element 11 is coupled to the inverting input node of buffer amplifier 8. Second impedance element 12, having M-fold balancing impedance ($MZ_B$), is coupled between the output node and the inverting input node of buffer amplifier 8. The non-inverting input node of buffer amplifier 8 is coupled to a common potential (ground).

Unilateral reception node RX is coupled through resistor 32 to the inverting input node of buffer amplifier 31. The output node of buffer amplifier 31 is coupled to unilateral transmission node TX, and the inverting input node of buffer amplifier 31 is coupled through resistor 33 to the connecting node between capacitor 28 and first impedance element 11. Resistor 36 is coupled between the output node and the inverting input node of buffer amplifier 31. The non-inverting input node of buffer amplifier 31 is coupled through resistor 35 to the output node of buffer amplifier 8, and is also coupled through resistor 34 to a common potential (ground).

The following description will be given to show that the subscriber line interface circuit of FIG. 3 functions according to the above-explained principle.

First, the aforementioned conditions (a) and (b) are considered.

Given that $V_R = 0$, let us now consider the transmission of unilateral reception voltage $V_{RX}$ to voltage $V_0$ between Subscriber nodes $L_1$ and $L_2$. From FIG. 3, the following two equations are attained:

$$i = \frac{V_0 - V_{RX}}{100 \cdot Z_T} \quad (17)$$

$$V_0 = -Z_B \cdot 100 \cdot i \quad (18)$$

Solving equations (17) and (18) for $V_0$, we obtain $$V_0 = \frac{Z_B}{Z_T + Z_B} V_{RX} \quad (19)$$

Therefore, the impedance of the subscriber line interface circuit as measured from the subscriber's side is $Z_T$.

Next, the aforementioned condition (c) is considered.

In order to consider the transmission of unilateral reception voltage $V_{RX}$ to unilateral transmission node TX, transmission voltage $-V_{TX}$ at transmission node TX is obtained.

$$-V_{TX} = (V_0 - V_{RX})\left(-\frac{Z_B}{Z_T} - 1\right) - V_{RX} \quad (20)$$

Substituting equation (19) into equation (20) yields $$-V_{TX} = -\frac{Z_T}{Z_B + Z_T} V_{RX} \left(-\frac{Z_B + Z_T}{Z_T}\right) - V_{RX} = 0$$

Obviously, therefore, there is no mixing of signal voltage $V_{RX}$ into signal voltage $V_{TX}$.

Let us now consider the aforesaid conditions (d) and (e).

With respect to the transmission of signal voltage $V_R$, generated in the subscriber terminal, to transmission node TX, the following two equations are derived from FIG. 3.

$$V_0 = 100 Z_T / i \quad (21)$$

$$V_0 = V_R - Z_B \cdot 100 \cdot i \quad (22)$$

Solving these two equations (21) and (22) for $V_0$, we obtain $$V_0 = \frac{Z_T}{Z_T Z_B} V_R \quad (23)$$

Thus, the impedance of the subscriber line interface circuit as measured from the subscriber's side can be set to $Z_T$. In this case, from FIG. 3, voltage $-V_{TX}$ of transmission node TX is expressed by the following equation:

$$-V_{TX} = V_0 \left(-\frac{Z_B}{Z_T} - 1\right) \quad (24)$$

From equations (23) and (24), we obtain $$-V_{TX} = -\frac{Z_T + Z_B}{Z_T + Z_B} V_R = -V_R$$

As should be clear from the above, signal voltage $V_R$ generated in the subscriber terminal is transferred as transmission voltage $V_{TX}$, irrespective of the phase.

According to the subscriber line interface circuit of FIG. 3, therefore, the terminal impedance $Z_T$ can be arbitrarily set and the hybrid function can be realized as well. In general, each terminal impedance $Z_T$ or $Z_B'$ is a series circuit of a resistor ($R_1$) and a capacitance. Since M-fold balancing impedance $MZ_B$ is inserted in the feedback path of buffer amplifier 8, the DC feedback cannot be achieved by the feedback of a series circuit of a resistor and a capacitance alone. In this respect, therefore, a high resistor ($R_2 >> MR_1$, where $R_2$ is its resistance) is actually provided in parallel to $MZ_B$.

According to the embodiment shown in FIG. 3, by setting $H = N = M = 100$, i.e., by using an impedance 100 times impedance $Z_B$, the capacitance can be reduced to 1/100, thus making the overall subscriber line interface circuit compact, which is very advantageous in reducing the size through an LSI.

A subscriber line interface circuit according to the second embodiment of this invention will now be explained with reference to FIG. 4.

The circuit of FIG. 4 differs from that of FIG. 3 only in that the amplification factors of the buffer amplifiers are set to be $A_1 = \frac{1}{2}$, $A_2 = -2$, $A_3 = -1$, $A_4 = -2$ and $A_5 = 2$. (Gains $A_1-A_5$ can be set to any value as long as the conditions given in equations (4), (14) and (15) are satisfied.) This means that the values of resistors 25, 26 and 33 and the value of resistor 35 in FIG. 3 are simply changed to R/2 and R, respectively, in FIG. 4. In this respect, therefore, the same reference numerals used in FIG. 3 are also used in FIG. 4. In the circuit of FIG. 4, amplification factor A1 is smaller than the one shown in FIG. 3. This is because due to a relatively high voltage applied between subscriber nodes $L_1$ and $L_2$, the dynamic range of the subsequent line or circuit is considered.

In the above embodiment, every resistor has either an integer multiplication or an integer fraction of a standard value R. This is because when realizing IC, it is easier to attain a high accuracy by using the same resistance for a plurality of resistors. Therefore in practice, the values for a plurality of resistors used in this circuit need not be in an integer ratio; any resistance can be selected as long as amplification factors $A_1-A_{15}$ are attained with the necessary accuracy.

The DC current feeding function of the subscriber line interface circuit of this invention will now be explained, referring to FIG. 5.

The subscriber line interface circuit SL includes a power feeding circuit not shown in FIG. 5. This power feeding circuit is provided to feed a constant current to a telephone set TP, which is typically used as a subscriber terminal coupled to subscriber nodes $L_1$ and $L_2$ via a subscriber line, so as to drive an acoustic transducer, such as a carbon microphone used in the telephone set. The current $I_L$ flowing through the subscriber line can be set, as desired, by reference voltage $V_{ref}$ that is supplied to subscriber line interface circuit S1 through resistor $R_f$.

A practical example of the above power feeding circuit will be explained, referring to FIG. 6.

The power feeding circuit of FIG. 6 has amplifiers 51–54, current detection impedance elements 55 and 56 and resistors 57–62. Power feeding amplifier 52 is coupled to one of subscriber nodes, $L_1$, through current impedance element 55. Subscriber node $L_1$ is also coupled to one end of impedance $Z_B'$ (as a load) of the subscriber terminal. Power feeding amplifier 53, which outputs a current of opposite phase to the phase of the current output by amplifier 52, is coupled to the other subscriber node $L_2$ through current detection impedance element 56. Subscriber node $L_2$ is also coupled to the other end of impedance $Z_B'$. A series circuit of resistors 59 and 58 is coupled between the output node of amplifier 52 and subscriber node $L_2'$ as illustrated. A series circuit of resistors 57 and 60 is coupled between subscriber node $L_1$ and the output node of amplifier 53 (see FIG. 6). The connecting node between resistors 59 and 58 is coupled to the non-inverting input node of current detection amplifier 54, while the connecting node between resistors 57 and 60 is coupled to the inverting input node of amplifier 51. The inverting input node of amplifier 51 is further coupled to an external reference voltage $V_{ref}$ through resistor $R_f$. In other words, the inverting input node of amplifier 51 is supplied with a DC current signal I coming from external reference voltage $V_{ref}$ through $R_f$. A feedback resistor 61 is coupled between the output node and the inverting input node of amplifier 51. The output node of amplifier 51 is further coupled to the input node of amplifier 52 as well as the input node of amplifier 53.

According to this circuit, DC current I given from reference voltage $V_{ref}$ is supplied to amplifiers 52 and 53, which output currents of the opposite phases, through amplifier 51. The outputs of amplifiers 52 and 53 are supplied to the subscriber's side or impedance $Z_B'$ through impedance elements 55 and 56, respectively. At this time, the voltage drops in impedance elements 55 and 56 are added and detected by amplifier 54, and then are fed back to amplifier 51. That is, the signal resulting from the addition of the output of amplifier 54 and reference signal I (DC current) is fed back to amplifiers 52 and 53, so that a current proportional to signal I is supplied to impedance $Z_B'$. In FIG. 6, given that resistors 57–60 are set to have the same value, and that the potentials at both ends of each of impedance elements 55 and 56 are $V_a$ and $V_b$ or $V_c$ and $V_d$, as illustrated, output voltage $V_e$ of amplifier 54 is expressed as follows:

$$V_e = (V_a - V_b) + (V_c - V_d)$$
$$= R_{M1} \cdot I_L + R_{M2} \cdot I_L,$$

where $R_{M1}$ and $R_{M2}$ are the impedances of impedance elements 55 and 56. Here, when $R_{M1} = R_{M2} = R_M$, $$V_e = 2R_M \cdot I_L$$

When this voltage $V_e$ is fed back to amplifier 51 and the gain for the feedback loop is sufficiently large, the power feeding is controlled to satisfy the following condition:

$$2R_M \cdot I_L = V_{ref}$$

As a result, the output current $I_L$ with respect to load impedance $Z_B'$ becomes constant, thus maintaining the constant current characteristic.

When a common-mode disturbance occurs in a load or on the subscriber's side, the impedance for the common mode as measured from the load is a parallel impedance of $R_{M1}$ and $R_{M2}$. This means that the subscriber line is terminated with the parallel impedance. In this case, since impedances $R_{M1}$ and $R_{M2}$ have resistances as low as several scores of ohms, it is unnecessary to use a particular circuit for the common-mode feedback, thus providing a power feeding circuit that is unlikely to be influenced by an external disturbance.

Figure 7:
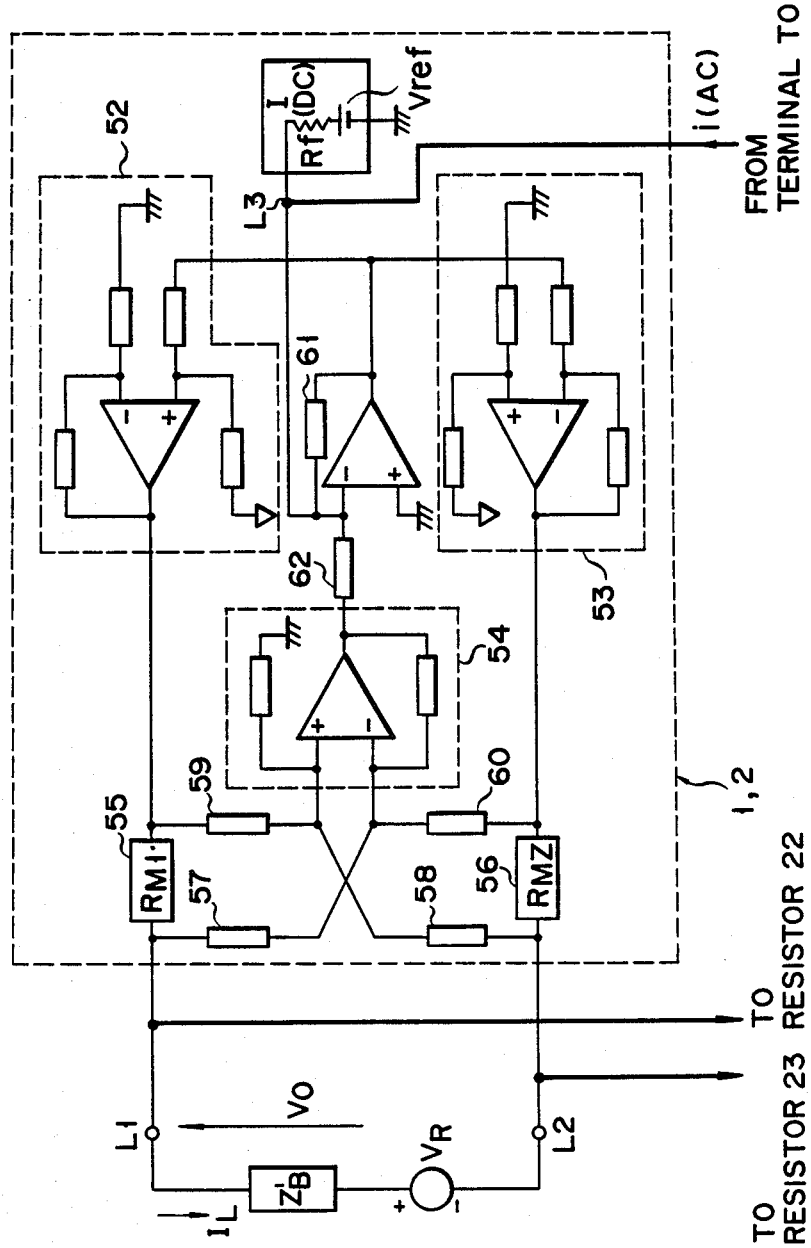
FIG. 7 is a block diagram illustrating the configuration of a power feeding circuit used in the embodiment shown in FIG. 3.

Referring now to FIG. 7, the following explains a practical structure of the power feeding circuit of FIG. 6, when utilized in the circuit according to the first embodiment of FIG. 3.

Signal nodes $L_1$ and $L_2$ shown in FIG. 7 are respectively connected to resistors 22 and 23 of FIG. 3, and the power feeding circuit of FIG. 7 serves as current-controlled current sources 1 and 2 of FIG. 3.

Figure 8:
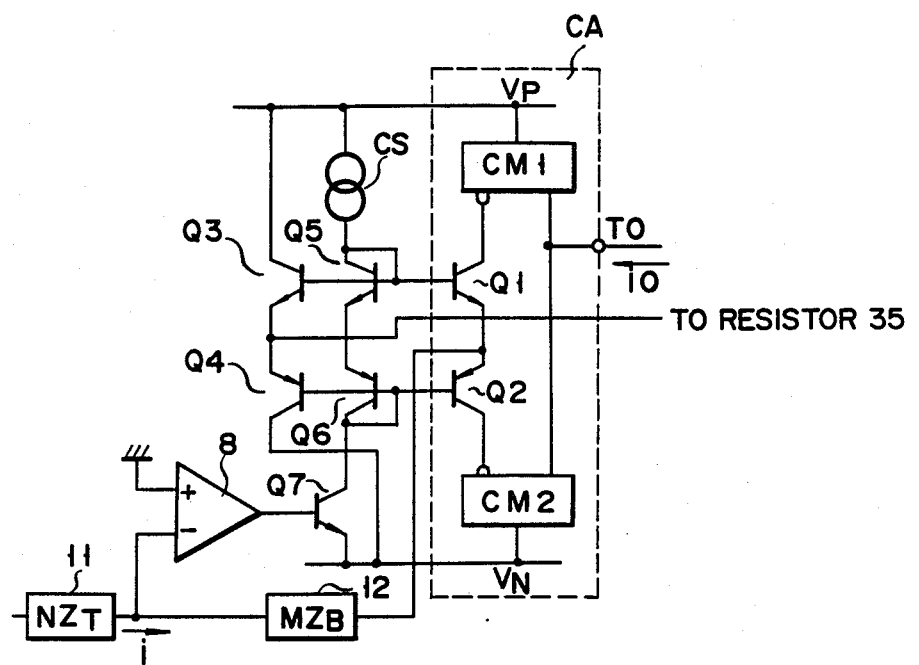
FIG. 8 is a block diagram illustrating the configuration of a current detection circuit applied to the embodiment of FIG. 3.

Current i (AC current) corresponding to the feedback current of buffer amplifier 8 of FIG. 3 is supplied to signal line $L_3$, through which DC current I flows, so that current i is added to DC current I. The current i is generated in a current detection circuit (FIG. 8). Accordingly, the current flowing through load impedance $Z_B'$ is $H \cdot (i+I)$.

Although the power feeding circuit of FIG. 7 uses amplifiers 52–54, which are given, when needed, with the feedback resistance and the input resistance, it is substantially the same as the circuit shown in FIG. 6 used to explain the principle of this invention.

In the above manner, the detection and supply of the current flowing through a load impedance $Z_B'$ would be carried out.

The power feeding circuit of FIG. 7 can apply, by itself, to the subscriber line interface circuit according to the second embodiment of this invention (see FIG. 4).

FIG. 8 illustrates a practical circuit for detecting current i flowing through feedback impedance MZB of buffer amplifier 8 and feeding back this current to the power feeding circuit of FIG. 7 via signal line $L_C$.

An output circuit including a current amplifier circuit CA is provided on the output side of buffer amplifier 8. The output circuit supplies the output voltage of buffer amplifier 8 to buffer amplifier 31 through resistor 35, as well as to one end of impedance element 12 which is in the feedback loop. The output circuit further outputs from node $T_0$ a current signal corresponding to the current flowing through impedance element 12 without impairing the aforementioned functions thereof.

Current amplifier circuit CA comprises a pair of transistors $Q_1$ and $Q_2$ and a pair of current-mirror circuits $CM_1$ and $CM_2$. Current-mirror circuits $CM_1$ and $CM_2$ provide, from the output side, those currents which are n times the currents respectively flowing through transistors $Q_1$ and $Q_2$ (input side). The output circuit further includes a pair of transistors $Q_3$ and $Q_4$, a pair of diode-connected transistors $Q_5$ and 16, a transistor $Q_7$ whose base is supplied with the output of buffer amplifier 8 is, and a current source CS. Transistors $Q_1$, $Q_3$ and $Q_5$ have their bases commonly coupled, and transistors $Q_2$, $Q_4$ and $Q_6$ have their bases commonly coupled. Transistors $Q_3$ and $Q_4$ have their emitters coupled together and have their collectors coupled to source potentials $V_P$ and $V_N$, respectively. A voltage corresponding to the voltage produced at the output node of buffer amplifier 8 is produced at the connecting node between transistors $Q_3$ and $Q_4$, and is supplied to buffer amplifier 31 through resistor 35. Current source CS, diode-connected transistors $Q_5$ and $Q_6$ and the collector-emitter circuit of transistor $Q_7$ are provided in series between source potentials $V_P$ and $V_N$, and supply a bias potential to the bases of transistors $Q_1$ and $Q_2$ of current amplifier circuit CA. Transistors $Q_1$ and $Q_2$ have their emitters coupled together and have their collectors respectively coupled to the inputs of current-mirror circuits $CM_1$ and $CM_2$. One end of impedance element 12 is coupled to the connecting node between the emitters of transistors $Q_1$ and $Q_2$. The outputs of current-mirror circuits $CM_1$ and $CM_2$ are commonly coupled to output current signal $i_0$ to the inverting input node of amplifier 51 of the power feeding circuit from node $T_0$.

When current i equal to the current flowing through impedance element 11 flows from impedance element 12 to the connecting node of the emitters of transistors $Q_1$ and $Q_2$, current amplifier circuit CA draws the current $i_0 = n \cdot i$ to node $T_0$. When current i is drawn from the connecting node between the emitters of transistors $Q_1$ and $Q_2$, current amplifier circuit CA outputs current $i_0 = n \cdot i$ from node $T_0$. In other words, when current i flowing through impedance $Z_T$ as measured from the subscriber's side, is supplied to current amplifier circuit CA that has a current ratio of n of current-mirror circuits $CM_1$ and $CM_2$, current $i_0 = n \cdot i$ is supplied from node $T_0$ to amplifier 51 of the power feeding circuit as a control signal.

The output circuit of FIG. 8 can also apply to the subscriber line interface circuit according to the second embodiment of this invention shown in FIG. 4.

What is claimed is:

1. A subscriber line interface circuit, coupled to a subscriber terminal and an exchange, for coupling said subscriber terminal and said exchange, comprising:
   a pair of subscriber nodes for coupling said subscriber line interface circuit with a subscriber terminal through a subscriber line;
   a pair of reception nodes and a pair or transmission nodes, for coupling said subscriber line interface circuit with said exchange through a unilateral reception line and a unilateral transmission line;
   power feeding means for feeding a DC current to said subscriber terminal through said subscriber nodes and for controlling said DC current;
   first adder means for adding a voltage between said pair of subscriber nodes and a voltage supplied between said pair of reception nodes;
   first impedance means having an impedance corresponding to a real-number multiplication of an impedance between said subscriber nodes, as observed from the side of said subscriber line and receiving an output voltage of said first adder means;
   inverting amplifier means which receives an output of said first impedance means;
   second impedance means having an impedance corresponding to a real-number multiplication of an impedance of said subscriber line and subscriber terminal, as observed from said subscriber nodes and inserted into a feedback path of said inverting amplifier means;
   feedback means for feeding a signal corresponding to a current flowing through said first impedance means, to said power feeding means as a control signal; and
   second adder means for adding an output voltage of said inverting amplifier means, an output voltage of said first adder means and a voltage supplied between said pair of reception nodes, and for supplying a resultant voltage between said pair of transmission nodes.

2. The circuit according to claim 1, wherein said feedback means includes direct detection means for detecting a current flowing through said first impedance means.

3. The circuit according to claim 2, wherein said direct detection means includes a resistor element coupled in series to said first impedance means, and potential difference detection means for detecting a voltage drop caused by said resistor element.

4. The circuit according to claim 1, wherein said feedback means includes indirect detection means for detecting a current flowing through said second impedance means, said current corresponding to a current flowing through said first impedance means.

5. The circuit according to claim 4, wherein said indirect detection means includes current generation means, provided on an output portion of said inverting amplifier means, for providing a current signal corresponding to said current flowing through said second impedance means.

6. A subscriber line interface circuit, coupled to a subscriber terminal and an exchange, for coupling said subscriber terminal and said exchange, comprising:
   a pair or subscriber nodes for coupling said subscriber line interface circuit with a subscriber terminal through a subscriber line;
   a pair of reception nodes and a pair of transmission nodes, for coupling said subscriber line interface circuit with said exchange through a unilateral reception line and a unilateral transmission line;
   power feeding means for feeding a DC current to said subscriber terminal through said subscriber nodes and for controlling said DC current;
   first adder means for adding a voltage between said pair of subscriber nodes and a voltage supplied between said pair of reception nodes;
   first impedance means having an impedance corresponding to a real-number multiplication of an impedance between said subscriber nodes, as observed from the side of said subscriber line and receiving an output voltage of said first adder means;
   inverting amplifier means which receives an output of said first impedance means;

second impedance means having an impedance corresponding to a real-number multiplication of an impedance of said subscriber line and subscriber terminal, as observed from said subscriber nodes and inserted into a feedback path of said inverting amplifier means;

feedback means for detecting a current flowing through said second impedance to provide a detection signal and feeding said detection signal to said power feeding means as a control signal; and second adder means for adding an output voltage of said inverting amplifier means, an output voltage of said first adder means and a voltage supplied between said pair of reception nodes, and for supplying a resultant voltage between said pair of transmission nodes.

7. The circuit according to claim 6, wherein said first adder means comprises one buffer amplifier having an inverting input node coupled to one of said subscriber nodes and one of said reception nodes through resistors and having a non-inverting input node coupled to the other subscriber node through a resistor.

8. The circuit according to claim 6, wherein said second adder means is a weighting adder circuit comprising one buffer amplifier.

* * * * *